US011006355B2

(12) United States Patent
Iyer et al.

(10) Patent No.: US 11,006,355 B2
(45) Date of Patent: May 11, 2021

(54) RADIO ACCESS TECHNOLOGY (RAT) SELECTION BASED ON DEVICE USAGE PATTERNS

(71) Applicant: QUALCOMM Incorporated, San Diego, CA (US)

(72) Inventors: Ashish Shankar Iyer, San Diego, CA (US); Vasanth Kumar Ramkumar, San Diego, CA (US); Naveen Kumar Pasunooru, Hyderabad (IN); Srinivasan Rajagopalan, San Diego, CA (US); Parthasarathy Krishnamoorthy, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/711,412

(22) Filed: Sep. 21, 2017

(65) Prior Publication Data

US 2019/0090181 A1   Mar. 21, 2019

(51) Int. Cl.
*H04W 36/14* (2009.01)
*H04W 48/18* (2009.01)
*H04W 24/08* (2009.01)
*H04B 17/318* (2015.01)
*H04W 48/00* (2009.01)

(52) U.S. Cl.
CPC .......... *H04W 48/18* (2013.01); *H04B 17/318* (2015.01); *H04W 24/08* (2013.01); *H04W 48/00* (2013.01)

(58) Field of Classification Search
CPC .............................. H04W 36/14; H04W 48/18
See application file for complete search history.

(56) References Cited

U.S. PATENT DOCUMENTS

| 2005/0003817 | A1* | 1/2005 | Ormson ................ H04W 48/18 455/435.2 |
| 2008/0014956 | A1* | 1/2008 | Balasubramanian ........................ H04L 41/0806 455/452.1 |
| 2009/0068969 | A1 | 3/2009 | Lindoff et al. |
| 2012/0002614 | A1* | 1/2012 | Ekici ..................... H04W 48/18 370/329 |
| 2014/0355521 | A1 | 12/2014 | Choi et al. |
| 2015/0005023 | A1* | 1/2015 | Wang .................... H04W 48/18 455/509 |

(Continued)

FOREIGN PATENT DOCUMENTS

| EP | 2613592 A1 | 7/2013 |
| EP | 2785107 A1 | 10/2014 |

OTHER PUBLICATIONS

International Search Report and Written Opinion—PCT/US2018/052202—ISA/EPO—dated Dec. 19, 2018.

*Primary Examiner* — Scott M Sciacca
(74) *Attorney, Agent, or Firm* — Qualcomm Incorporated

(57) ABSTRACT

Methods and apparatus for selection of radio access technology (RAT) based on device usage patterns are provided. A User Equipment (UE) obtains information relating to one or more Quality of Service (QoS) metrics for communication of data by the UE. The UE designates a Radio Access Technology (RAT) from a plurality of available RATs as a preferred RAT for the communication, based on the obtained information.

29 Claims, 10 Drawing Sheets

(56) References Cited

U.S. PATENT DOCUMENTS

| | | | |
|---|---|---|---|
| 2016/0088529 A1* | 3/2016 | Yoon ..................... | H04W 48/18 |
| | | | 455/436 |
| 2016/0234749 A1* | 8/2016 | Singh ................ | H04W 36/0022 |
| 2018/0049108 A1* | 2/2018 | Yang ....................... | H04W 4/70 |
| 2019/0059052 A1* | 2/2019 | Nord ..................... | H04W 36/14 |

* cited by examiner

RADIO ACCESS TECHNOLOGY (RAT) SELECTION BASED ON DEVICE USAGE PATTERNS

FIELD

The present disclosure relates generally to wireless communication systems, and more particularly, to methods and apparatus for selecting a Radio Access Technology (RAT) for data communication by a device based on usage patterns of the device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes obtaining information relating to one or more Quality of Service (QoS) metrics for communication of data by the UE, and designating a Radio Access Technology (RAT) from a plurality of available RATs as a preferred RAT for the communication, based on the obtained information.

Certain aspects of the present disclosure provide an apparatus for wireless communication by a UE. The apparatus generally includes means for obtaining information relating to one or more Quality of Service (QoS) metrics for communication of data by the UE, and means for designating a Radio Access Technology (RAT) from a plurality of available RATs as a preferred RAT for the communication, based on the obtained information.

Certain aspects of the present disclosure provide an apparatus for wireless communication by a UE. The apparatus generally includes at least one processor and a memory coupled to the at least one processor. The at least one processor is generally configured to obtain information relating to one or more Quality of Service (QoS) metrics for communication of data by the UE, and designate a Radio Access Technology (RAT) from a plurality of available RATs as a preferred RAT for the communication, based on the obtained information.

Certain aspects of the present disclosure provide a computer-readable medium for wireless communication by a UE. The computer-readable medium generally stores instructions accessible by at least one processor for performing a method including obtaining information relating to one or more Quality of Service (QoS) metrics for communication of data by the UE, and designating a Radio Access Technology (RAT) from a plurality of available RATs as a preferred RAT for the communication, based on the obtained information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
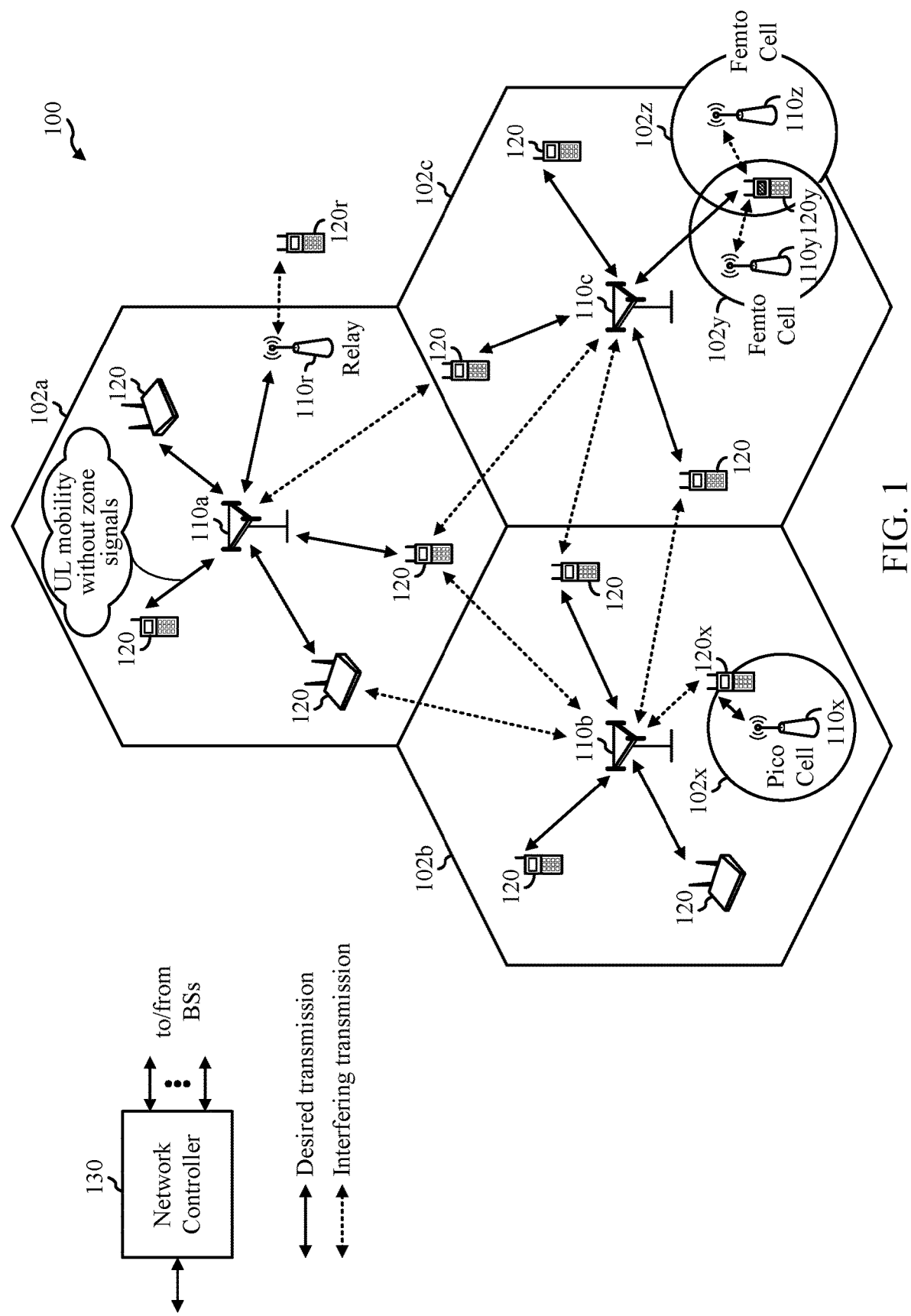
FIG. 1 is a block diagram conceptually illustrating an example telecommunications system, in accordance with certain aspects of the present disclosure.

Certain devices (e.g., User Equipments (UEs) and/or UE modems) may support multiple Radio Access Technologies (RATs), for example, low power RATs, including, for example, Narrowband Internet of Things (NB-IoT) and CAT M1 (enhanced MTC (eMTC)). However, no mechanism currently exists for a clear arbitration between different RATs. Generally, devices may either be configured in a static manner to attach to one of the RATs or may measure all available RATs (e.g., periodically) and switch between RATs dynamically.

Certain aspects of the present disclosure discuss techniques for selection of a RAT from multiple available RATs based on device usage patterns. In certain aspects device data Quality of Service (QoS) metrics may be used to select a RAT during system selection or during RAT arbitration. In certain aspects, a UE may obtain information relating to one or more Quality of Service (QoS) metrics for communication of data by the UE. The UE may designate a Radio Access Technology (RAT) from a plurality of available RATs as a preferred RAT for the communication, based on the obtained information NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP).

cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
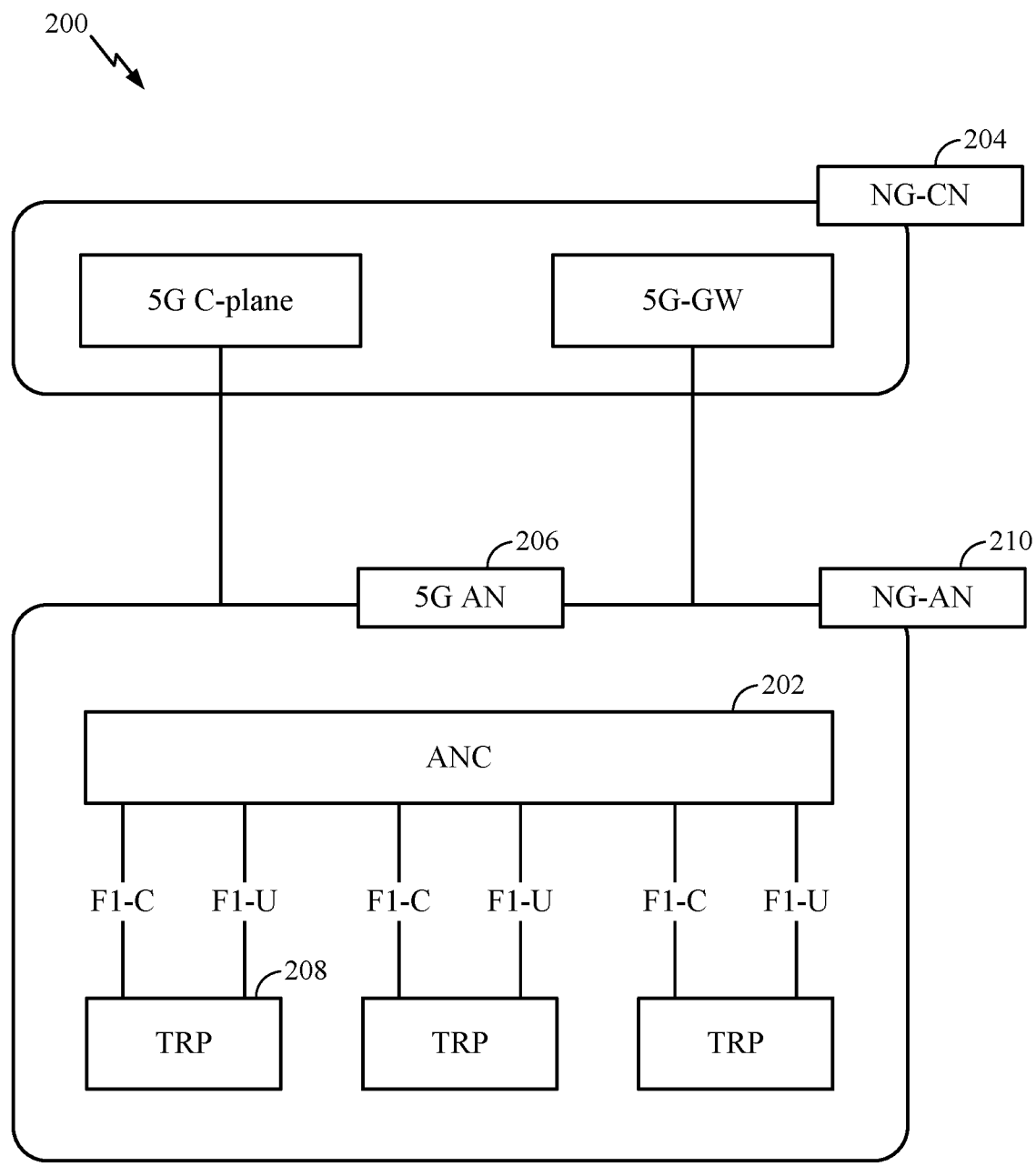
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
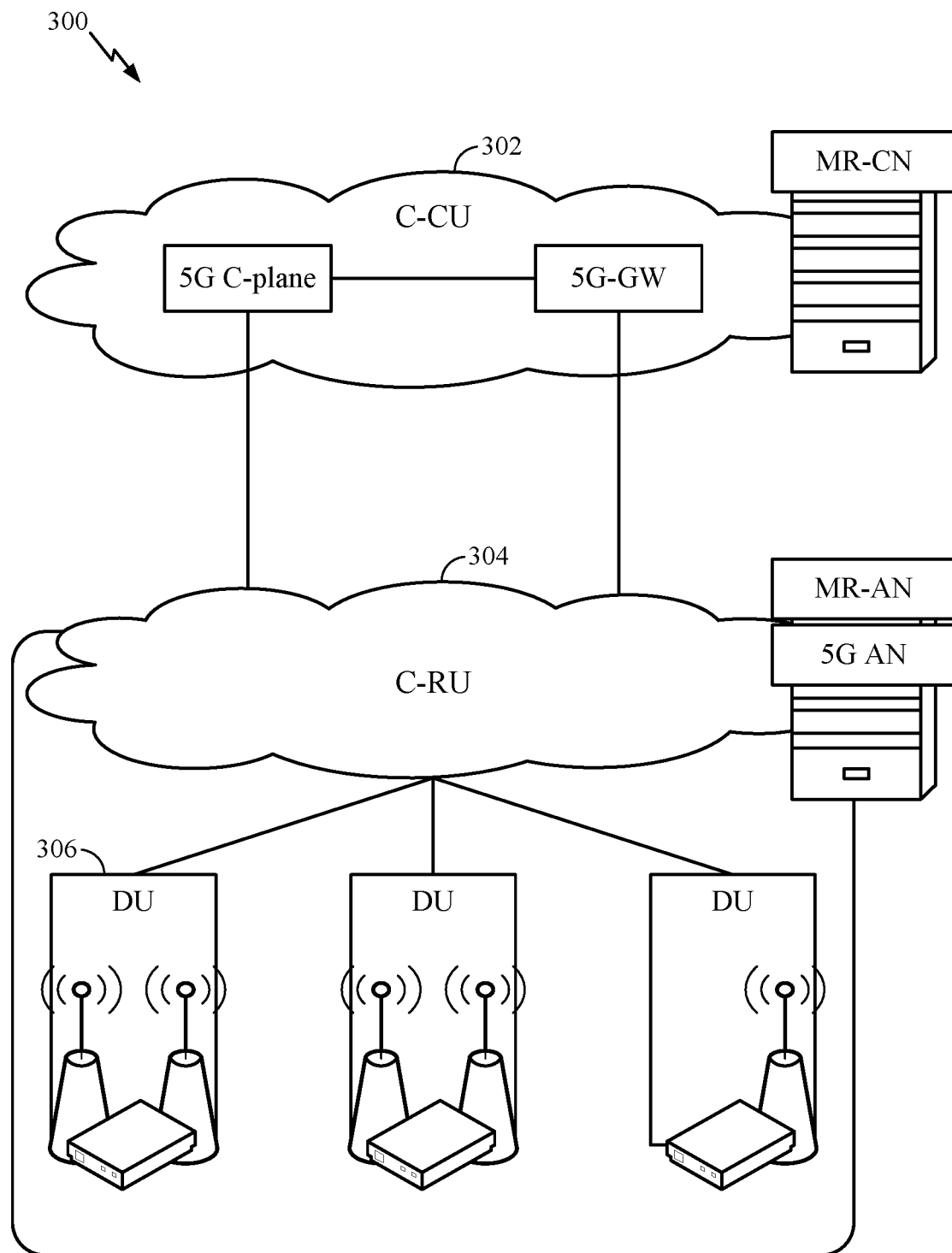
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
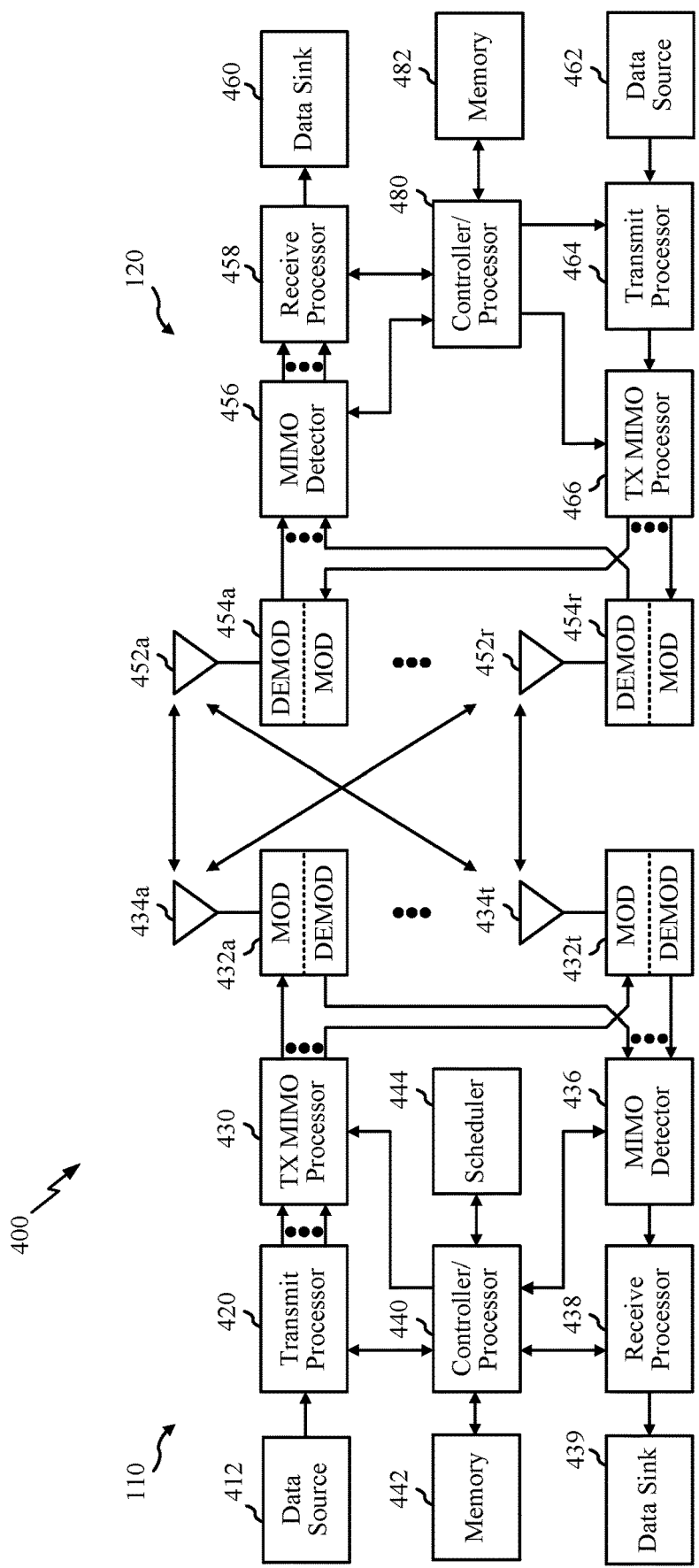
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 8, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
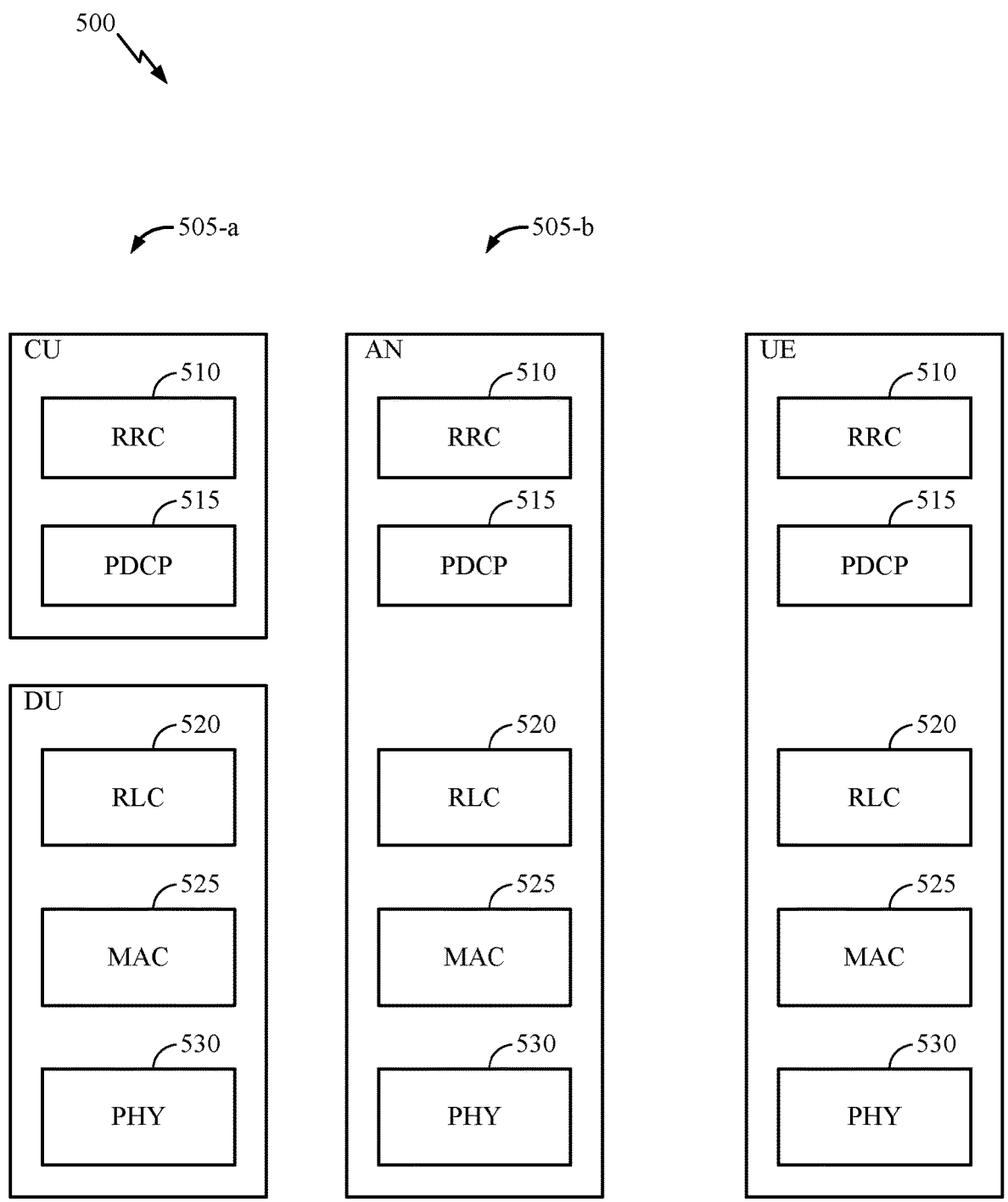
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
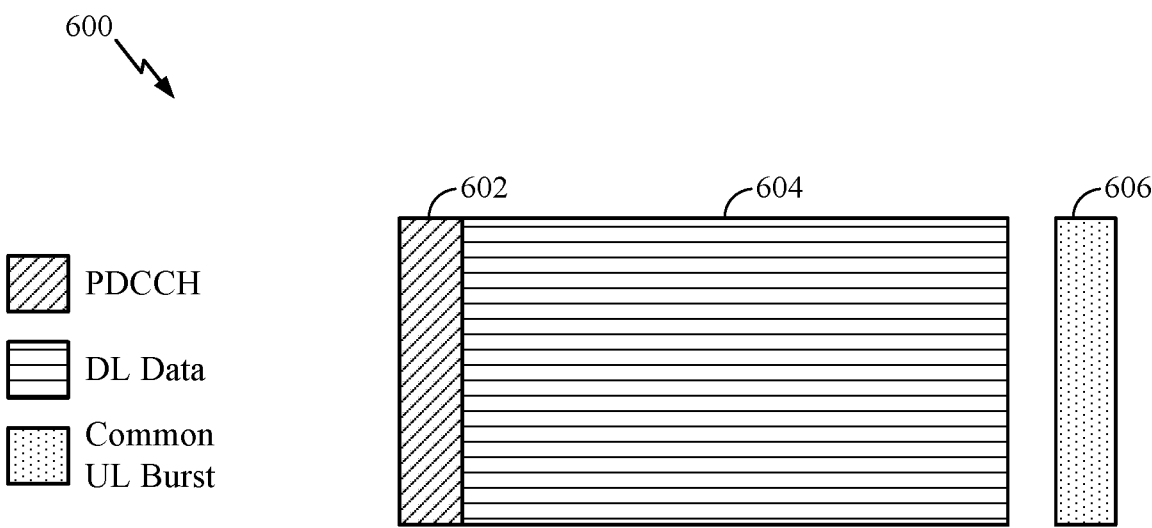
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
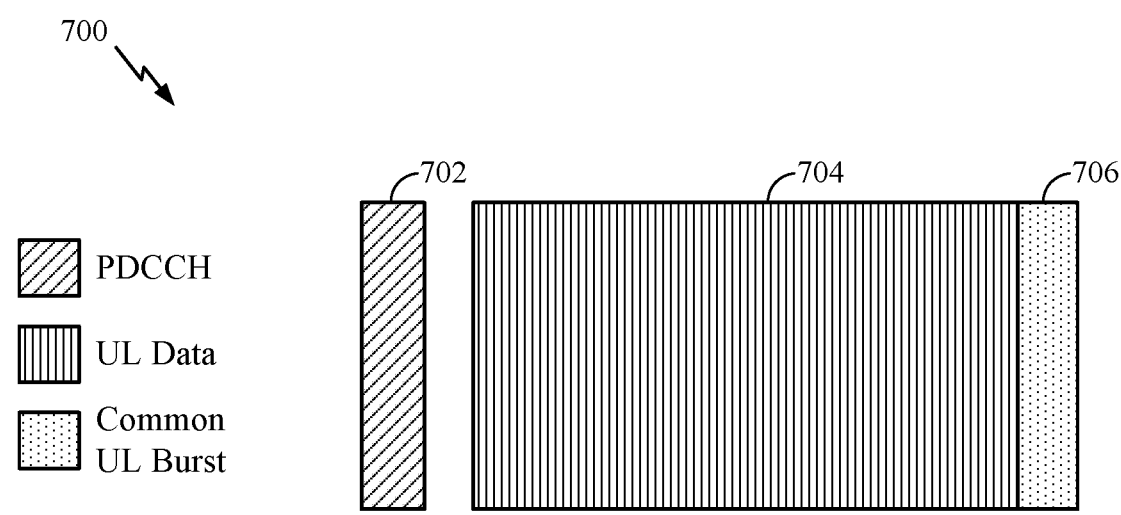
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Certain devices (e.g., UEs and/or UE modems) may support multiple low power Radio Access Technologies (RATs) including, for example, Narrowband Internet of Things (NB-IoT) and CAT M1. However, no mechanism currently exists for a clear arbitration between different RATs. Generally, devices may either be configured in a static manner to attach to one of the RATs or may measure all available RATs (e.g., periodically) and switch between RATs dynamically.

In some cases, the device may select a particular RAT without any consideration for Quality of Service (QoS) or other application layer requirements. For example, the device may be preconfigured with priorities associated with each RAT and may select a particular RAT among available RATs based on the configured RAT priorities.

In some cases, the device may be configured to perform battery intensive processing including, for example, RAT measurements, system scan etc., to switch between RATs. This may defeat the purpose of low power technologies and their concurrent usage for different applications.

An example of a device capable of using low power RATs is a power meter installed in a regular household. The power meter generally has one or more sensors that collect power information including information relating to user power usage. The power meter may need to report the collected information, for example, periodically, to a server (e.g., a server at a power utility provider). A modem (e.g., included in the power meter or as a separate entity) may collect the information to be communicated and send it out to the server. The modem may support multiple RATs and may select one of the available RATs for the communication. As noted above, according to current methods, the power meter may either be configured in a static manner to attach to one of the RATs or may measure all available RATs (e.g., periodically) involving power intensive processing and switch between RATs dynamically. These RAT selections and/or switches generally do not consider QoS or other application layer requirements.

Certain aspects of the present disclosure discuss techniques for selection of a RAT from multiple available RATs based on device usage patterns. In certain aspects device data Quality of Service (QoS) metrics may be used to select a RAT during system selection or during RAT arbitration.

Figure 8:
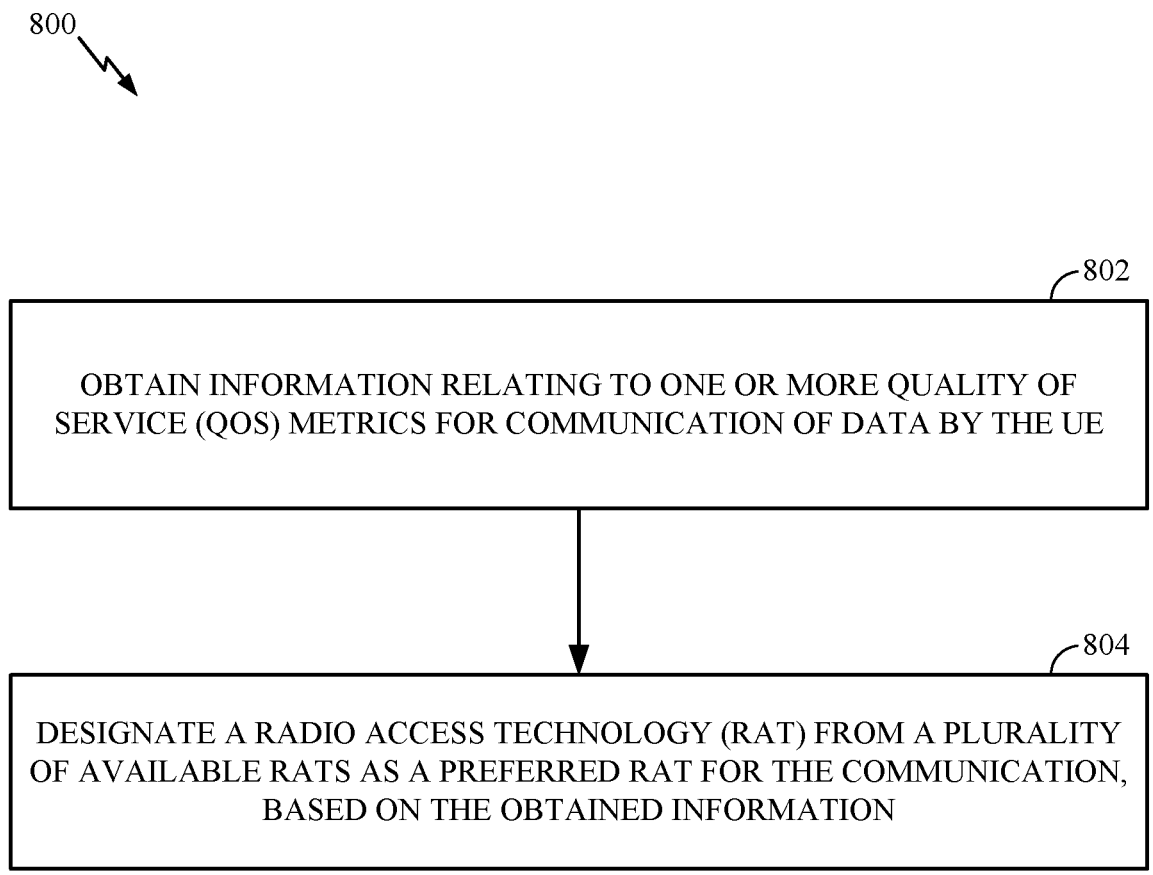
FIG. 8 illustrates example operations performed by a communications device (e.g., UE) for selecting a RAT, in accordance with certain aspects of the present disclosure.

FIG. 8 illustrates example operations 800 performed by a communications device (e.g., UE) for selecting a RAT, in accordance with certain aspects of the present disclosure. Operations 800 begin, at 802, by obtaining information relating to one or more QoS metrics for communication of data by the UE. At 804, the UE designates a RAT from a plurality of available RATs as a preferred RAT for the communication, based on the obtained information.

In certain aspects, the device designates a preferred RAT based on the one or more QoS metrics related to the data to be communicated. For example, the QoS metrics include minimum bitrate needed, periodicity of access requests and latency requirement. The periodicity of access requests metric indicates a periodicity with which the device needs to request access to a base station (e.g., gNB) for communication of the data. The latency requirement metric indicates the time taken for data, once transmitted, to reach a target device (e.g., a gNB). For example, voice data communications have a lower latency requirement as compared to data transmissions which can tolerate higher latencies. In an aspect, the QoS metrics include a power efficiency metric. The power efficiency metric may indicate an amount of power (e.g., in milli watts) that is to be used in a given time period for communication of a given amount of data.

For example, NB-IoT is a low data rate and power efficient technology with maximum data rates of about 50 kbps. Further, NB-IoT is more suitable for data communications with lower periodicity of access requests (e.g., 1 access request a day). CAT-M1, on the other hand, supports a higher (e.g., around 1 Mbps) peak data rate but is less power efficient than NB-IoT. Additionally, CAT-M1 is suitable for data communications with higher periodicity of access requests and supports lower latency than NB-IoT. Given the QoS metrics related to the data to be communicated, the device may select between NB-IoT and CAT-M1 RATs that is best suited for the communication of the data.

For example, a device supports both NB-IoT and CAT-M1 and determines, for example, after running, e.g., modem data profiling, that the device has a very low data requirement of 3-4 Mbs over a month (e.g., a few 100 Kbs every day). Based on the bit rate requirement, the device designates NB-IoT as the preferred RAT for the communication. In an aspect, if the device is performing initial RAT selection (e.g., when powered on), the device sends an acquisition request for NB-IoT instead of CAT-M1. In an aspect, if the device is already camped on a CAT-M1 network, the device triggers mobility to an NB-IoT network. In certain aspects, once camped on NB-IoT, if the device detects an urgent need to send more data, the device may trigger mobility to a CAT-M1 cell. The device may continue to collect QoS metrics and may return to NB-IoT when the urgent requirement has been serviced.

In certain aspects, each device (e.g., UE) may include one or more application processors, each application processor collecting data (e.g., from multiple sources) and/or generating data to be transmitted out by the device. In an aspect, each device may have one or more application processors that may generate different amounts of data for transmission, for example, related to different applications. For example, the power meter discussed above may include one or more application processors collecting power information from the one or more sensors of the power meter. Each sensor may be assumed to correspond to a different application. In some cases, the power meter may have one application processor for each sensor that collects power data from the sensor.

In certain aspects, each application processor, for example based on collected data and/or other information regarding the collected data, generates data to be transmitted out of the device, for example, by a modem. Additionally, each application processor may provide one or more QoS metrics related to communicating data generated by the application processor. In an aspect, the QoS metrics include minimum bitrate needed, periodicity of access requests and latency requirement. In an aspect, the device may designate a preferred RAT based on an aggregated data stream which includes data streams for each application, for example, generated by multiple application processors. The QoS metrics from one or more application processors may be aggregated for a particular device by a modem layer, and used for selecting a RAT including initial RAT selection (e.g., at device power on) or RAT switching for mobility decisions when the device is already attached to a RAT. In certain aspects, based on the aggregated QoS metrics, the modem may select a RAT that is most suited for communicating the data.

In certain aspects, additionally or alternatively, the device may collect QoS metrics for the device over a given time period and may use the historical QoS metrics data for RAT selection. For example, the device may keep track of historical data access requests by the device over time, periodicity of data access requests, and average bitrate over which data was transmitted (or received) over a monitored time period, and use this information for selecting a RAT. In an aspect, the device uses the collected one or more QoS metrics averaged over the given time period for selection of the preferred RAT.

In certain aspects, the modem may obtain a QoS metrics requirement from multiple sources (e.g., current QoS metrics from different application processors, stored historical QoS metrics information, etc.) and the modem may use a combined metric based on the QoS metrics information from these different sources while selecting between RATs during system selection and/or inter-RAT mobility processes.

In certain aspects, in addition to using the QoS metrics of data to be communicated by a device for RAT selection, the device may use quality of RATs as measured by the device for the RAT selection. For example, the device may consider system quality of available RATs (e.g., NB-IoT, CAT-M1 etc.) as an additional metric for the RAT selection. In certain aspects, selecting a RAT that is below a required quality metric may lead to a low QoS which may be undesirable. In an aspect, the device may select a RAT only if the RAT's quality metric is above a threshold quality metric. In an aspect, the quality metric for a RAT includes a received signal strength corresponding to the RAT as measured by the device. For example, a device may designate a particular RAT as a preferred RAT based on one or more QoS metrics related to the data to be communicated, but may actually select the RAT based on the quality of the RAT itself.

In certain aspects, when camped on a particular RAT, the device may detect a temporary requirement for a given QoS for communicating data. In response, the device may temporarily switch to another RAT that supports the temporary QoS requirement. The device may switch back to the previous RAT when the temporary QoS requirement has been serviced. In an aspect, the device continually (e.g., periodically or based on one or more triggers) monitors the QoS metrics and detects when the temporary QoS requirement has been serviced.

In certain aspects, the device may detect a temporary requirement for a given latency for communication, and in response, may temporarily switch to another RAT that meets the temporary latency requirement while optionally optimizing power consumption. In certain aspects, the device may detect a temporary requirement for a given bitrate for communication, and in response, may temporarily switch to another RAT that meets the temporary bitrate requirement while optionally optimizing power consumption. In certain aspects, the device may detect a temporary requirement for a given periodicity of access requests for the communication, and in response, temporarily switch to another RAT that meets the periodicity of access requests requirement while optionally optimizing power consumption. In certain aspects, the device may detect a battery state of the UE (e.g., below a threshold battery power), and in response, may temporarily switch to another RAT that optimizes power consumption to extend battery life of the UE.

In an aspect, the device switches to another RAT only if a remaining battery life of the UE is below a threshold. For example, if the device is camped on a high performing RAT that consumes relatively more power, the device will switch to a lower performing and lower power consuming RAT only if the remaining battery power of the device is below a threshold battery power.

Figure 9A:
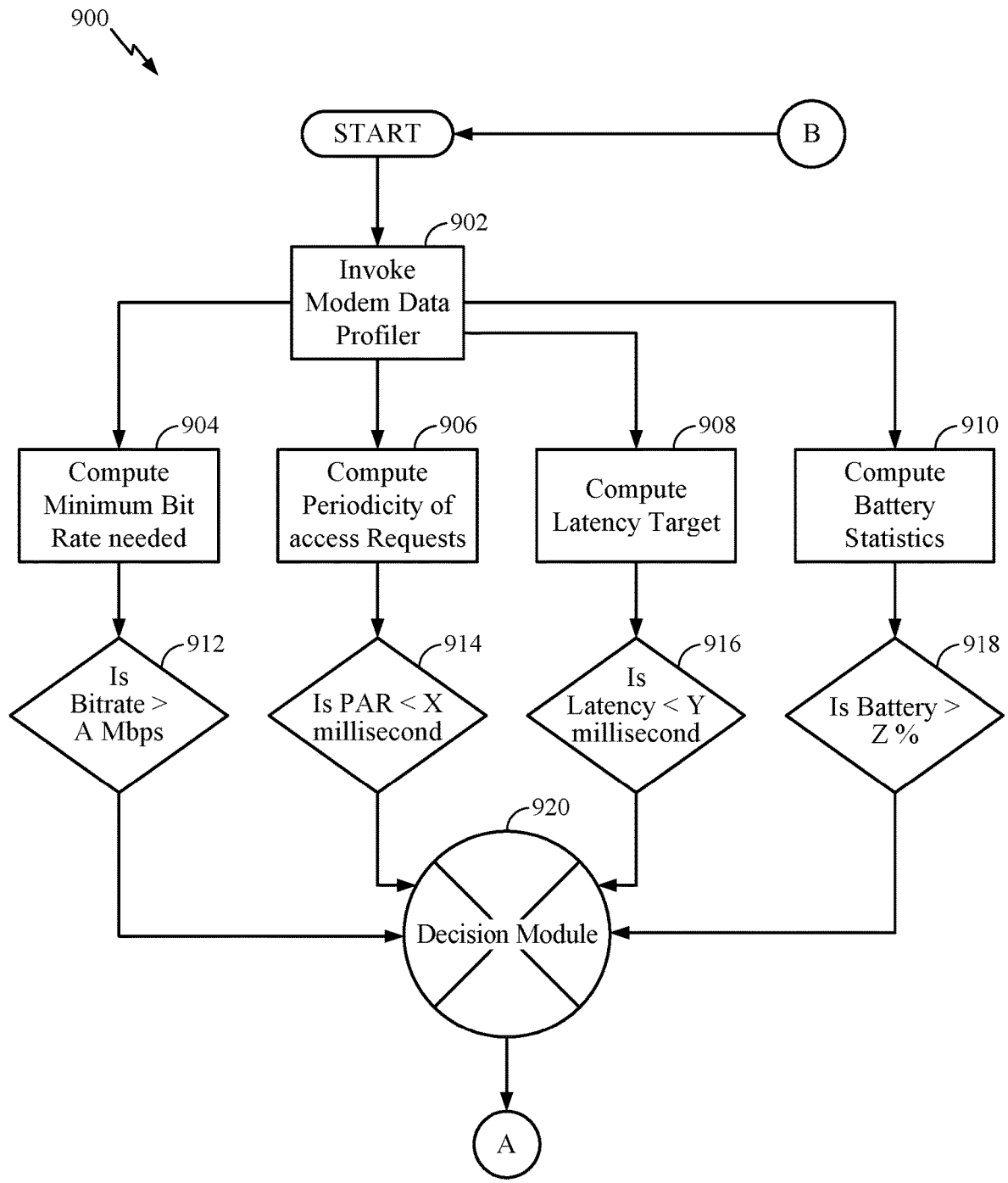
FIGS. 9A and 9B illustrate example operations that may be performed by a communications device (e.g., UE) for RAT selection, in accordance with certain aspects of the present disclosure.
Figure 9B:
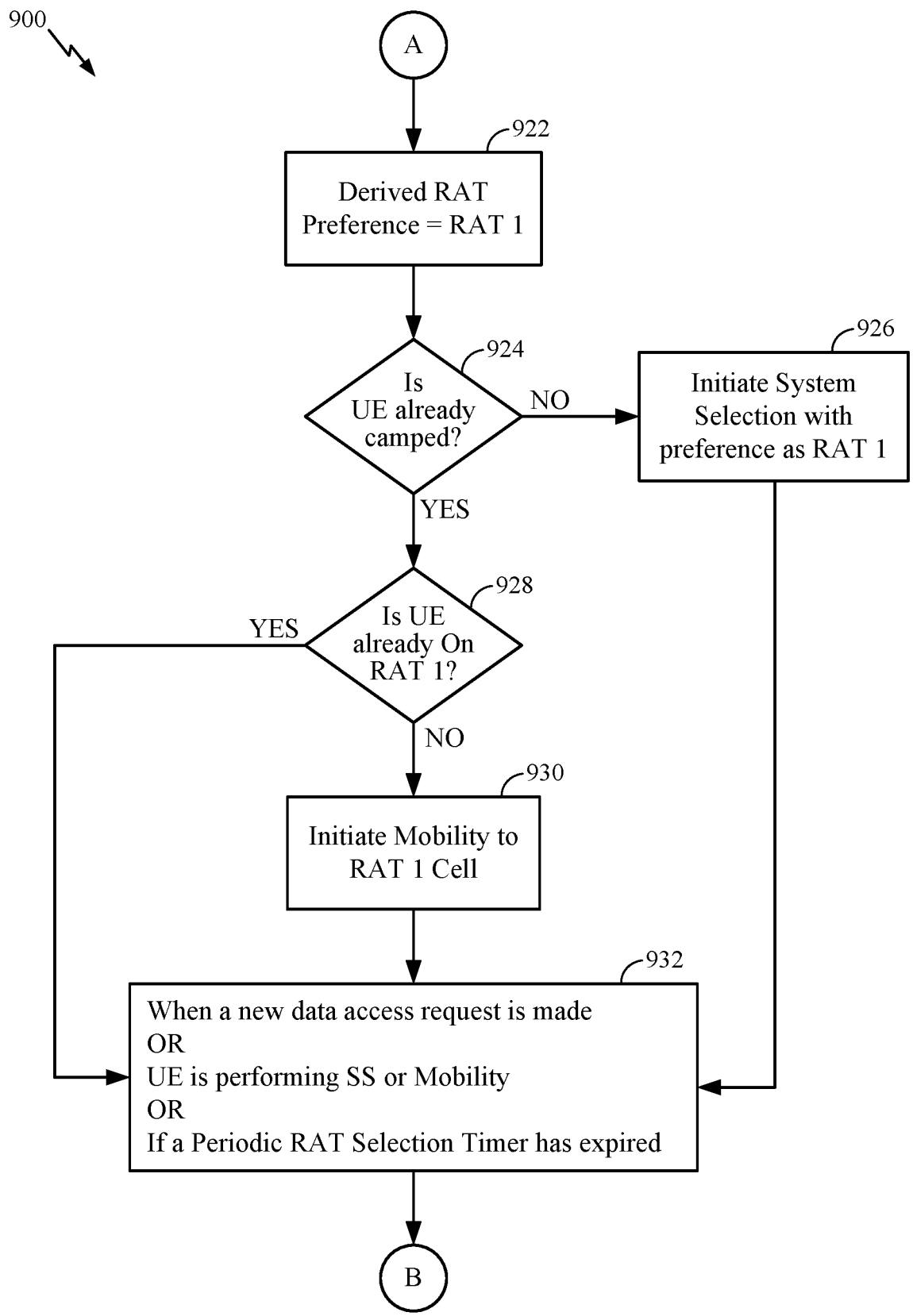

FIGS. 9A and 9B illustrate example operations 900 that may be performed by a communications device (e.g., UE) for RAT selection, in accordance with certain aspects of the present disclosure. In an aspect, operations 900 are performed by a modem included in or associated with the UE.

As shown in FIG. 9A, operations 900 begin, at 902, by invoking, e.g., a modem data profiler module associated with the UE. In an aspect, the modem data profiler includes sub-modules for computing values of QoS metrics relating to transmitting a data stream. As shown, at 904 the modem data profiler computes a minimum bit rate needed for the transmission. At 906, the modem data profiler computes periodicity of access requests for the transmission. At, 908, the modem data profiler computes latency target for the transmission. At 910, the modem data profiler computes battery statistics related to the transmission. For example, the battery statistics includes the amount of power that is required for the transmission. Once the metric values have been computed, all four computed metric values are compared to their respective thresholds. As shown, at 912, the UE checks whether the computed bit rate is greater than a given (e.g., pre-configured) threshold bit rate (e.g., A Mbps). At 914, the UE checks whether the computed periodicity of access requests (PAR) is less than a given (e.g., pre-configured) threshold (e.g., X milliseconds). At 916, the UE checks whether the computed latency target is less than a given (e.g., pre-configured) threshold latency (e.g., Y milliseconds). At 918, the UE checks whether the computed battery power required for the transmission is more than a given (e.g., pre-configured) threshold battery power (e.g., Z %). At 920, results of all four comparisons are fed to a decision module. The decision module, based on the results of the comparisons, designate a RAT among multiple available RATs as a preferred RAT for the transmission.

As shown in FIG. 9B, at 922, the decision module designates RAT 1 as the preferred RAT for the transmission. Once the RAT preference is derived, the UE, at 924, checks whether the device is already camped on a particular RAT. If not, the UE initiates system selection with RAT 1 set as the preferred RAT. In an aspect, the UE overrides all other RAT preferences that may have been set in previous cycles of the method shown in FIGS. 9A and 9B. If the UE is already camped on to a RAT network, the UE, at 928, checks if the UE is already camped on to the preferred RAT 1. If not, the UE, at 930, initiates mobility to a RAT 1 cell. If the UE is already camped on to a RAT 1 cell, the UE initiates the transmission of data to the RAT 1 cell.

Once the UE is camped onto a RAT 1 cell (e.g., after initial system selection or RAT mobility), the UE continually checks for one or more conditions, and initiates a new operations cycle when one or more of the conditions are met. For example, at 932, the UE triggers a new method cycle when a new data access request is made, the UE is performing a system synchronization (SS) or mobility procedure, or if a periodic RAT selection timer has expired. The RAT selection timer may be configurable and maintained internally and ensures that the UE is not stuck on a higher performing RAT supporting a higher bit rate and consuming more power even after the requirement for the higher performing RAT is no longer present.

In certain aspects, the modem data profiler constantly collects data relating to one or more of the QoS metrics. So, when a new method cycle is triggered, data (e.g., metric values) is already available for each of the QoS metrics.

In an aspect, the modem data profiler and the decision module reside within the UE modem or are implemented by the UE modem. In an aspect, the modem data profiler computes QoS metrics values for an aggregated data stream, for e.g., from multiple application processors.

Figure 10:
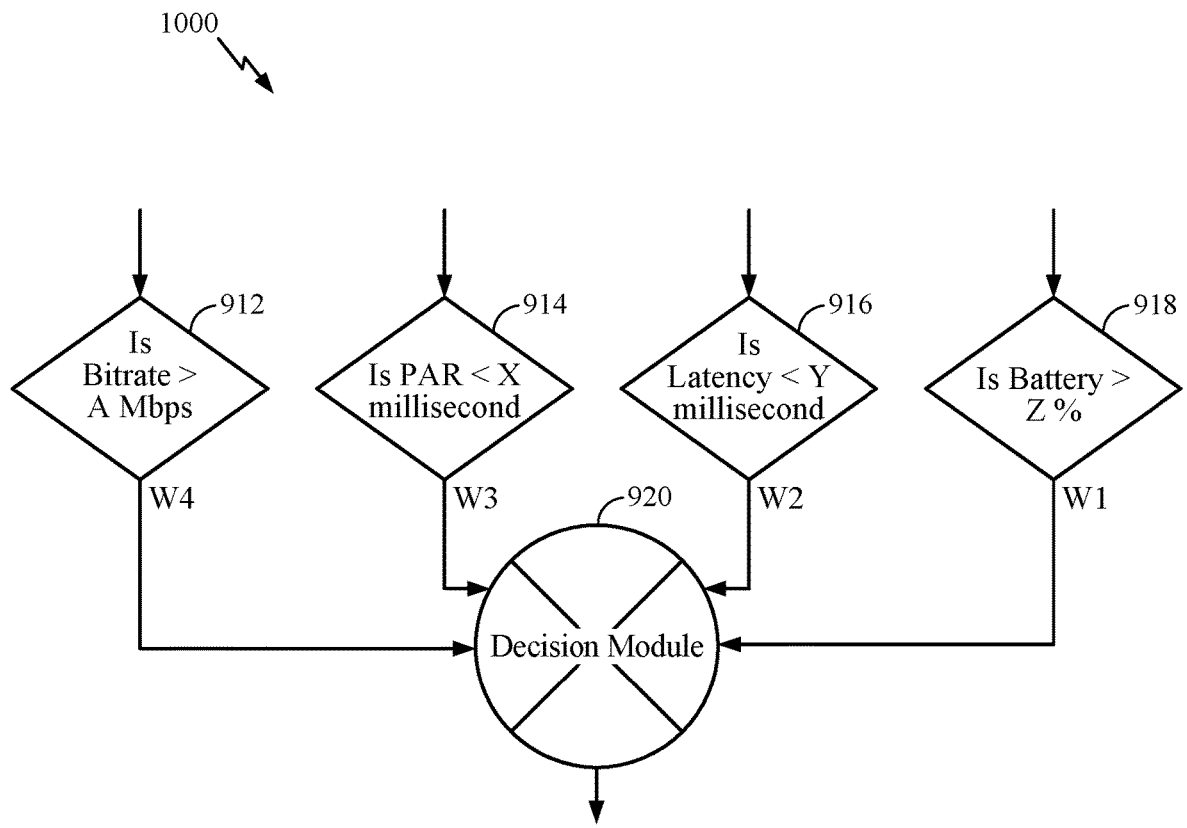
FIG. 10 illustrates a state transition diagram showing how a RAT is selected by a decision module (e.g., of a UE modem) based on QoS metrics values, in accordance with certain aspects of the present disclosure.
Figure 10:
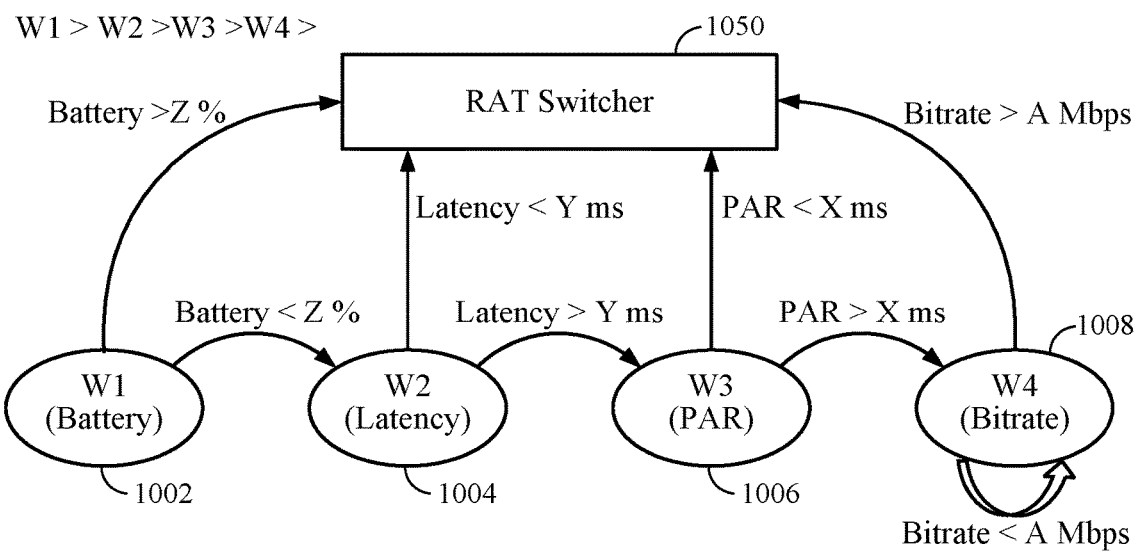

FIG. 10 illustrates a state transition diagram 1000 showing how a RAT is selected by a decision module (e.g., of a UE modem) based on QoS metrics values, in accordance with certain aspects of the present disclosure. In certain aspects, the decision block assigns different weights to each metric value input to the decision block and determines if the RAT must be switched (e.g., from a RAT preference set in a previous method cycle) based on the weighted metric values. In the example illustrated in FIG. 10, the battery threshold, latency threshold, PAR and bitrate are assigned weights in decreasing order with the battery metric having the highest weight and the bitrate having the lowest weight. As shown, the battery threshold is assigned a weight W1, the latency threshold is assigned a weight W2, the PAR is assigned is assigned a weight W3, and the bit rate is assigned a weight W4, where W1>W2>W3>W4.

As shown in the state transition diagram, at 1002, the decision block first checks if the battery threshold is met, for example, if battery consumption>Z %. If the battery threshold is met, the decision module triggers the RAT switcher 1050. If the battery threshold is not met, the decision module, at 1004 next checks if the latency threshold is met, for example, if latency<Y ms. If the latency threshold is met, the decision module triggers the RAT switcher 1050. If the latency threshold is not met, the decision module, at 1006, next checks if the PAR threshold is met, for example, if PAR<X ms. If the PAR threshold is met, the decision module triggers the RAT switcher 1050. If the PAR threshold is not met, the decision module, at 1008, next checks the bit rate threshold, for example, if bit rate>A Mbps. If the bit rate threshold is met the decision module triggers the RAT switcher 1050. If the bit rate threshold is not met, the decision module does not invoke the RAT switcher 1050 until the next method cycle when the state transition again starts from step 1002.

In certain aspects, the RAT switcher 1050 decides which RAT of multiple RATs is selected for the RAT switch based on the QoS metric thresholds.

In certain aspects, the weights may be assigned in a different order and the state transition diagram will change accordingly. In an aspect, the decision to invoke the RAT switcher is based on the following equation.

$$W1*Vb+W2*PAR+W3*\text{Latency}+W4*BR=Z$$

Where, Vb is battery consumption value, PAR is the periodicity of access requests, and BR is the bit rate, and Z is an integer.

The RAT switcher is invoked if Z>threshold_switch, where threshold_switch is a threshold value for the RAT switcher.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
    obtaining information relating to one or more Quality of Service (QoS) metrics for communication of data by the UE, wherein the data comprises aggregated data of multiple streams of data, and wherein the information comprises the one or more QoS metrics for each of the multiple streams of data;
    aggregating the one or more QoS metrics to generate an aggregated QoS for the aggregated data;
    designating a Radio Access Technology (RAT) from a plurality of available low power RATs as a preferred low power RAT for the communication, based on the aggregated QoS, wherein the plurality of available low power RATs comprise more than one type of lower power RAT;
    initiating system selection to the preferred low power RAT, when the UE is not camped on any RAT; and
    initiating mobility to the preferred low power RAT, when the UE is camped on a low power RAT different from the preferred low power RAT.

2. The method of claim 1, wherein the one or more QoS metrics include at least one of minimum required bitrate, periodicity of access requests, latency requirement or power efficiency.

3. The method of claim 1, further comprising aggregating the multiple streams of data.

4. The method of claim 1, wherein the information includes information relating to the one or more QoS metrics based on current data communication requirements of the UE.

5. The method of claim 1, further comprising collecting the one or more QoS metrics over a given time period, wherein the information includes information based on the collected one or more QoS metrics over the given time period.

6. The method of claim 5, wherein the information includes information relating to the collected one or more QoS metrics averaged over the given time period.

7. The method of claim 1, further comprising selecting the preferred RAT for the communication of the data.

8. The method of claim 7, wherein selecting the preferred RAT comprises selecting the preferred RAT based on a quality metric of the RAT.

9. The method of claim 8, further comprising selecting the preferred RAT only if the quality metric of the preferred RAT is above a threshold quality.

10. The method of claim 8, wherein the quality metric includes received signal strength for the RAT as measured by the UE.

11. The method of claim 7, further comprising switching the UE from a current RAT to the selected RAT.

12. The method of claim 1, further comprising:
    detecting a temporary requirement for a given QoS for the communication; and
    in response, temporarily switching to another RAT that supports the temporary QoS requirement.

13. The method of claim 1, further comprising:
    detecting a temporary requirement for a given latency for the communication; and
    in response, temporarily switching to another RAT that meets the temporary latency requirement while optimizing power consumption.

14. The method of claim 1, further comprising:
    detecting a temporary requirement for a given bitrate for the communication; and
    in response, temporarily switching to another RAT that meets the temporary bitrate requirement while optimizing power consumption.

15. The method of claim 1, further comprising:
    detecting a temporary requirement for a given periodicity of access requests for the communication; and
    in response, temporarily switching to another RAT that meets the temporary periodicity requirement while optimizing power consumption.

16. The method of claim 1, further comprising:
    detecting a battery state of the UE; and
    in response, temporarily switching to another RAT that optimizes power consumption to extend battery life of the UE.

17. The method of claim 16, wherein the temporarily switching includes switching to the another RAT if a remaining battery life of the UE is below a threshold.

18. An apparatus for wireless communication by a User Equipment (UE), comprising:
- means for obtaining information relating to one or more Quality of Service (QoS) metrics for communication of data by the UE, wherein the data comprises aggregated data of multiple streams of data, and wherein the information comprises the one or more QoS metrics for each of the multiple streams of data;
- means for aggregating the one or more QoS metrics to generate an aggregated QoS for the aggregated data;
- means for designating a Radio Access Technology (RAT) from a plurality of available low power RATs as a preferred low power RAT for the communication, based on the aggregated QoS, wherein the plurality of available low power RATs comprise more than one type of lower power RAT;
- means for initiating system selection to the preferred low power RAT, when the UE is not camped on any RAT; and
- means for initiating mobility to the preferred low power RAT, when the UE is camped on a low power RAT different from the preferred low power RAT.

19. The apparatus of claim 18, wherein the one or more QoS metrics includes at least one of minimum required bitrate, periodicity of access requests, latency requirement or power efficiency.

20. The apparatus of claim 18, further comprising means for collecting the one or more QoS metrics over a given time period, wherein the information includes information based on the collected one or more QoS metrics over the given time period.

21. The apparatus of claim 20, wherein the information includes information relating to the collected one or more QoS metrics averaged over the given time period.

22. An apparatus for wireless communication by a User Equipment (UE), comprising:
- at least one processor;
- memory coupled to the at least one processor; and
- instructions stored on the memory and executable by the at least once processor to cause the apparatus to:
  - obtain information relating to one or more Quality of Service (QoS) metrics for communication of data by the UE, wherein the data comprises aggregated data of multiple streams of data, and wherein the information comprises the one or more (QoS) metrics for each of the multiple streams of data;
  - aggregate the one or more QoS metrics to generate an aggregated QoS for the aggregated data;
  - designate a Radio Access Technology (RAT) from a plurality of available low power RATs as a preferred low power RAT for the communication, based on the aggregated QoS, wherein the plurality of available low power RATs comprise more than one type of lower power RAT;
  - initiate system selection to the preferred low power RA, when the UE is not camped on any RAT; and
  - initiate mobility to the preferred low power RAT, when the UE is camped on a low power RAT different from the preferred low power RAT.

23. The apparatus of claim 22, wherein the one or more QoS metrics includes at least one of minimum required bitrate, periodicity of access requests, latency requirement or power efficiency.

24. The apparatus of claim 22, wherein the instructions are further executable by the at least one processor to cause the apparatus to collect the one or more QoS metrics over a given time period, wherein the information includes information based on the collected one or more QoS metrics over the given time period.

25. The apparatus of claim 24, wherein the information includes information relating to the collected one or more QoS metrics averaged over the given time period.

26. A non-transitory computer-readable medium for wireless communication by a user equipment (UE), the computer-readable medium storing instructions accessible by at least one processor for performing a method comprising:
- obtaining information relating to one or more Quality of Service (QoS) metrics for communication of data by the UE, wherein the data comprises aggregated data of multiple streams of data, and wherein the information comprises the one or more (QoS) metrics for each of the multiple streams of data;
- aggregating the one or more QoS metrics to generate an aggregated QoS for the aggregated data;
- designating a Radio Access Technology (RAT) from a plurality of available low power RATs as a preferred low power RAT for the communication, based on the aggregated QoS, wherein the plurality of available low power RATs comprise more than one type of lower power RAT;
- initiating system selection to the preferred low power RAT, when the UE is not camped on any RAT; and
- initiating mobility to the preferred low power RAT, when the UE is camped on a low power RAT different from the preferred low power RAT.

27. The non-transitory computer-readable medium of claim 26, wherein the one or more QoS metrics includes at least one of minimum required bitrate, periodicity of access requests, latency requirement or power efficiency.

28. The non-transitory computer-readable medium of claim 26, further comprising instructions for collecting the one or more QoS metrics over a given time period, wherein the information includes information based on the collected one or more QoS metrics over the given time period.

29. The non-transitory computer-readable medium of claim 28, wherein the information includes information relating to the collected one or more QoS metrics averaged over the given time period.

* * * * *